Patented Oct. 19, 1937

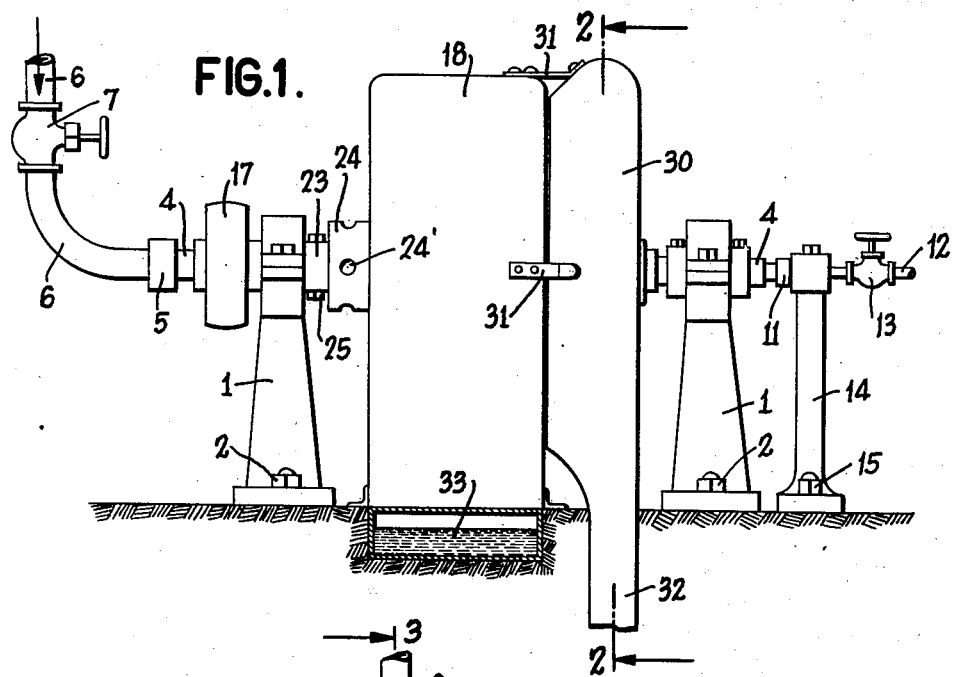
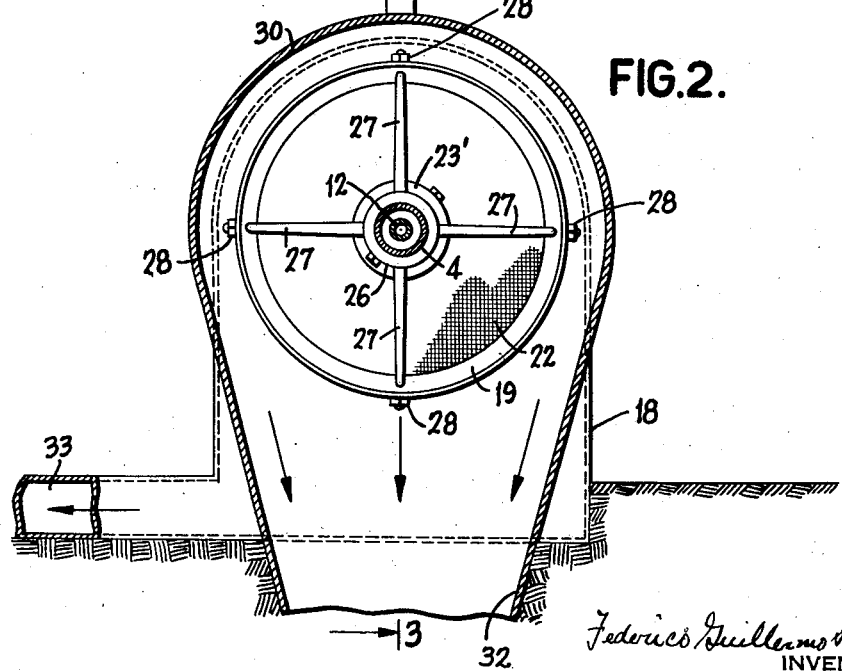

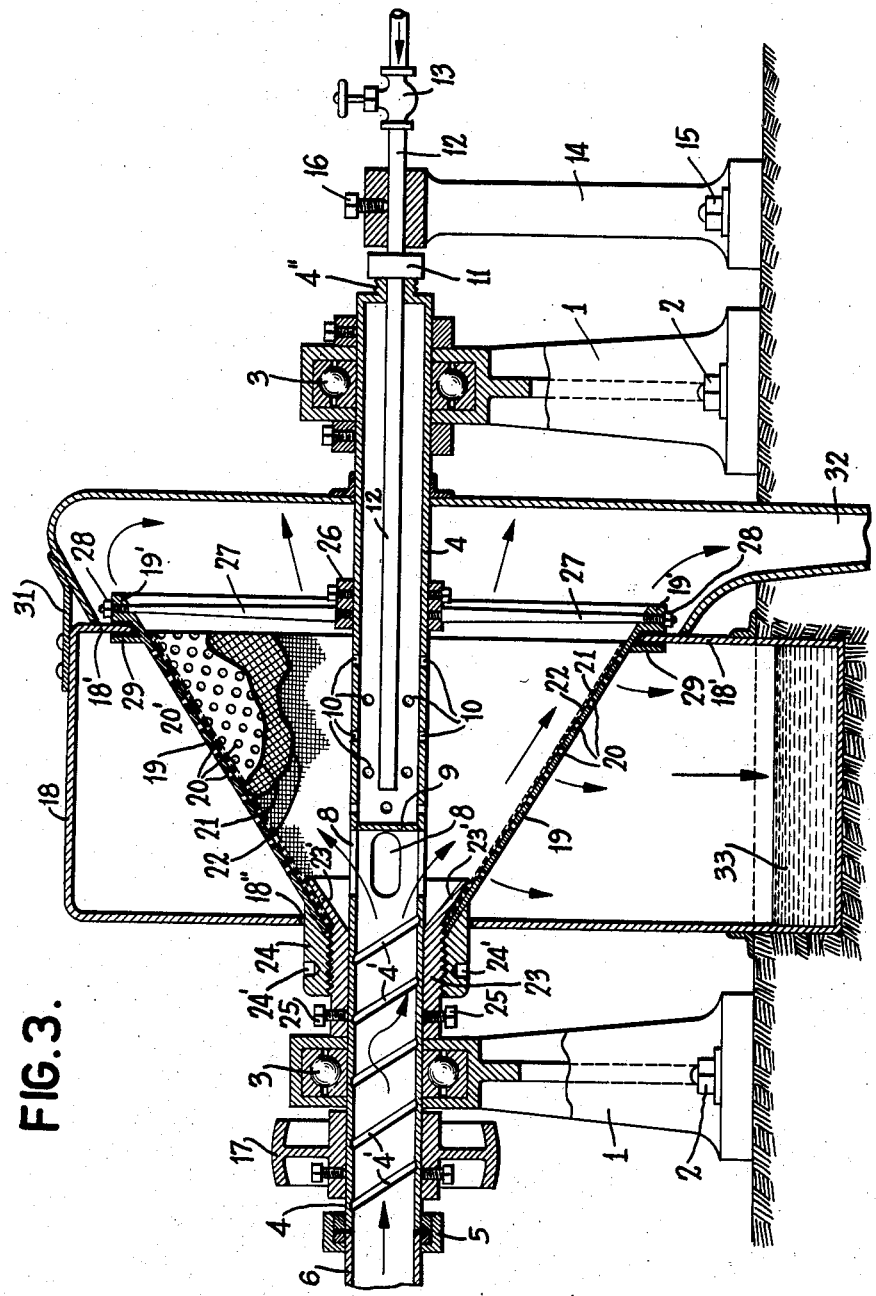

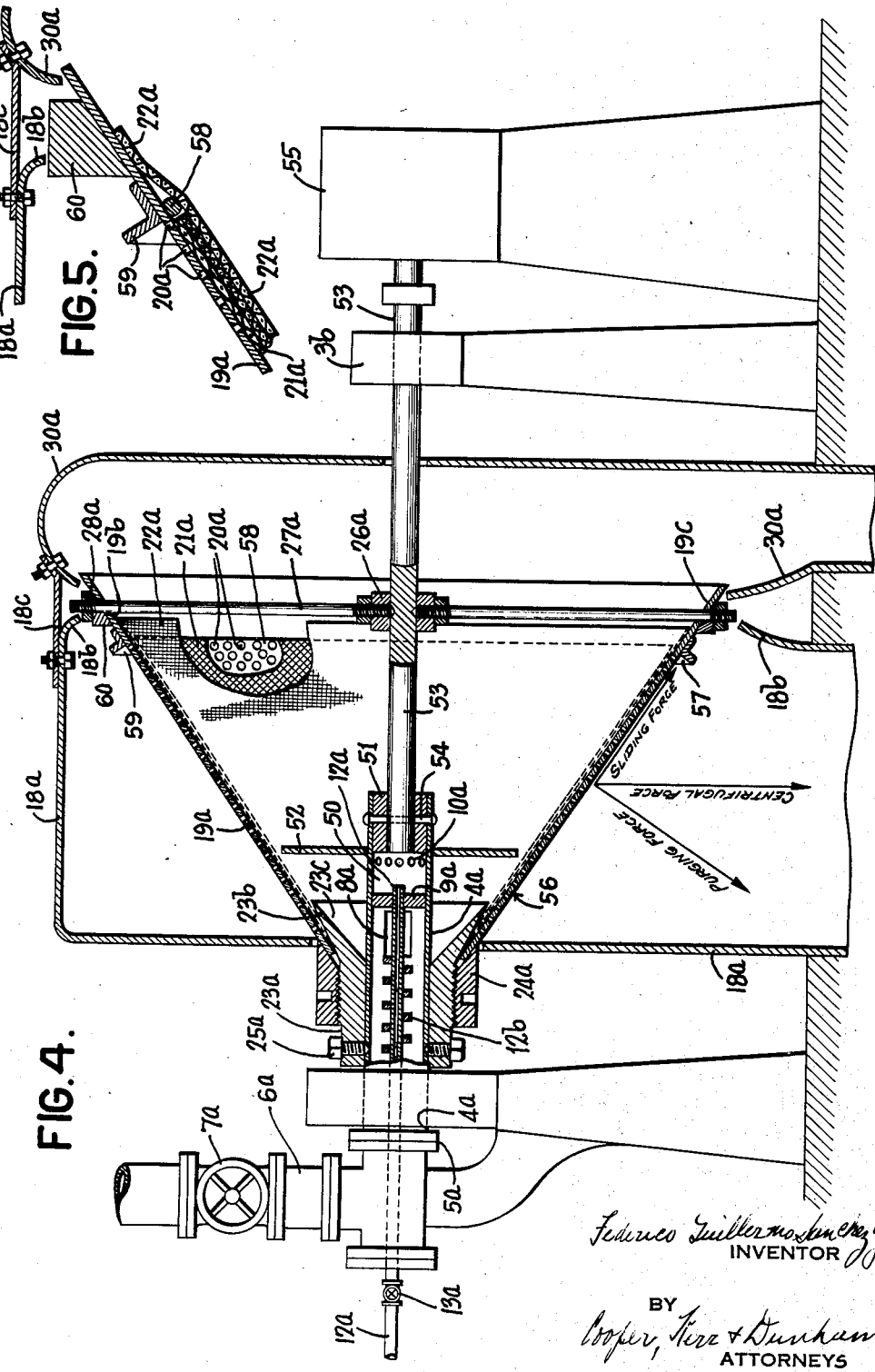

2,096,594

UNITED STATES PATENT OFFICE 2,096,594

CONTINUOUS AND AUTOMATIC CENTRIFUGAL SEPARATOR

Federico Guillermo Sanchez y Cil, Habana, Cuba

Application February 15, 1936, Serial No. 64,085
In Cuba May 15, 1933

12 Claims. (Cl. 210—68)

This invention refers to a separator which will continuously receive, and automatically eject the material which passes through it, principally in separating molasses from massecuite, though it may be readily used in the separation of solids from liquids, by the application of centrifugal force to a body substantially conically shaped.

It is a well known fact that the application of centrifugal force, by rapidly rotating a cylindrical body, as is the case in the standard centrifugal separators, forces the molasses out of the massecuite leaving the sugar crystals dry, the molasses passing through the small openings perforated on the sides of the cylinder. The crystals cannot pass through the openings on the side of the cylinder and therefore are collected inside the separator. In the case of the cylindrical body the centrifugal force acts normally, or perpendicularly, to the surface without any other component force, hence the material to be worked must be injected while the separator is at rest, then rotated rapidly until the separation has taken place, and again brought to a standstill in order to eject the charge. This process is not only very wasteful of time in the operation of the separator, but it has the enormous disadvantage of requiring a very large force to give the separator a rapid acceleration. Almost immediately that full velocity is attained the separation is complete, and the separator has to be stopped quickly by the use of a powerful brake. This last operation is most wasteful of energy, and deteriorating to the separator in general.

With my invention I use a conical body instead of a cylindrical one, as the usual practice is, and the axis of rotation of my separator is horizontal, although it may be worked also vertically. The horizontal position of my separator has very obvious advantages over the vertical separator in the simplicity of construction and operation. The conical shape of my apparatus eliminates all the disadvantages and waste of the standard machines, on account of the following fundamental principles:

The centrifugal force generated in my separator when rotating, meets the surface of the "cone" at such an angle that it is divided into two component forces. One of these forces acts normally to the plane and ejects the liquid through the openings, as in the usual separator. The other component force acts parallel to the surface of the cone, and makes the solid matter slide along this surface toward the larger end of the cone. Although the friction between the surface of the cone and the matter treated increases as the latter loses its liquid contents, the centrifugal force, hence its parallel component, also increases toward the larger end of the cone, causing a normal and steady flow of the solids toward the larger end of the cone, where it is finally ejected. As the material treated loses its liquid, it becomes more difficult to separate the last particles of this liquid adhering to the crystals, but this is automatically taken care of by the fact that the surface of contact with the cone increases rapidly as the diameter increases, which has the effect of spreading out the material, thereby reducing its thickness and facilitating the separation of the liquid from the solid. This last case is also greatly aided by the increase in centrifugal force, as mentioned. These processes of separation of the liquid from the solid, and the sliding of the material along the cone take place simultaneously and continuously.

The advantages of my invention can be briefly summarized as follows; 1—Great reduction in the power needed to run the machines. 2—Saving of much time in the operation. 3—Large reduction in labor to run a battery of these machines. 4—Simplicity of construction and operation, with a much reduced bill for repairs and upkeep.

In the treatment of the massecuite the resulting product is much more uniform in quality since the layer of sugar crystals is very thin and each crystal loses its molasses evenly with all the others, which is not the case in the actual practice now.

Another advantage of my invention is the fact that the water injection, to facilitate the proper cleaning of the sugar crystals, can be regulated and fixed to any desired amount, when the work of this machine does not need the constant attention of the operator.

Further objects of my invention according to certain embodiments thereof, reside in the provision of an improved arrangement and relation of parts whereby the machine is better adapted for direct drive by an electric motor. Other features reside in the provision of an improved arrangement of basket, screens, and discharge apertures for the incoming massecuite, with the apertures so placed that all of the massecuite material strikes a smooth part of the basket before coming in contact with the screens. In this way initial sliding of the massecuite is provided for, and clogging at the inlet point is prevented. Supplemental means in the form of a disc is provided to prevent splashing or rebounding of the massecuite towards the sugar delivery point and for controlling the flow of the massecuite to the screens. Another feature resides in the provision of an improved screening and liquid diverting arrangement adjacent to the point of delivery of the dried sugar crystals, whereby liquid material is definitely diverted through the perforated basket and prevented from passing along the surface of the basket and possibly rejoining the dried sugar crystals. Suitable means in the form of a diverting ring are also provided for keeping expelled liquid separate from the dried sugar. Other features reside in a water pipe arrangement exteriorly threaded to help the natural flow of the massecuite into the machine. Other incidental features relate to the arrangement of the driving shaft having a hollow section and a solid section of relatively reduced diameter. The solid section extending to the driving motor.

In the accompanying drawings:

Fig. 1 is a side elevation of the centrifugal separator.

Fig. 2 is a vertical cross section at the line 2—2 in Fig. 1.

Fig. 3 is a vertical cross section at the line 3—3 in Fig. 2.

Fig. 4 is a vertical cross section of the modified construction, along the line 3—3 in Fig. 2, and Fig. 5 is a larger scale view of the screen arrangement at the outer periphery of the basket, and diverting discs.

With reference to these figures, 1 represents the two supports of the main shaft, held to the foundations by anchor bolts 2. The hollow shaft 4 is supported by two bearings 3.

This hollow shaft 4 is also a feeder to the separator, through which the materials to be treated enter. It has a spiral groove inside 4' followed by four openings 8 through which the materials pass into the centrifuge. Next to these openings is a fixed partition 9. On the other side of this partition the shaft has several holes drilled 10 through which water passes in.

Shaft 4 is connected to pipe 6 by a coupler 5 that allows the shaft to turn freely while receiving the material from the pipe. This pipe 6 has a valve 7 that regulates the flow of the material. At the other end of the shaft 4 the small pipe 12 is introduced which carries the water. This pipe has a valve 13 and is connected to some sort of water supply. This pipe can be fixed at any position within the shaft 4 by the set screw 16 mounted on pedestal 14. This pipe 12 will discharge water at the place corresponding to the holes in the shaft 4 marked 10. 17 is a pulley fixed to shaft 4 through which rotation is obtained from a motor or engine not shown.

Shaft 4 between the bases 1 is enclosed by a cover 18 whose back end is open but with the edges bent as shown by 18', while its front end has an opening 18" through which passes the small end of a conical body 19 made of metal with a large number of small holes drilled through its whole surface 20, connected to each other by small grooves 20'. This conical body is covered inside with the usual linings in standard practice in all centrifuges, as shown by 21 and 22.

The conical body 19 is firmly held to the shaft 4 by a bushing 23 which in turn is fixed to the shaft by the set screws 25. This bushing 23 has a conical wing 23' to which the smaller end of the cone 19 is perfectly adapted and held in position by nut 24 that screws over the bushing 23. This nut is tightly screwed by the use of a wrench that engages the holes 24'.

At the larger end the conical body 19 is held to the shaft 4 by the rods 27 placed radially. These rods are held by the collar 26, and their outer ends are fixed to the conical body 19 by the screws 28.

At the outer edge of the conical body 19 there is a ring 19', and between this ring and another one 29 is inserted the bent edge 18' of cover 18.

Held by the braces 31 cover 30 is made fast to cover 18. This last cover 30 collects the materials ejected at the end of the cone 19 and leads them through 32 to the proper deposit.

A deposit 33 is for the purpose of collecting the liquids ejected by the cone 19 when they strike the cover 18 and fall down by gravity.

The operation of this separator is as follows:

The separator is started rotating by a belt from the motor at hand, and when it has acquired the normal speed the massecuite is allowed to run in through the pipe 6 and valve 7 into the hollow shaft 4. The spiral 4' will help the flow towards the opening 8, and the partition 9 will not allow it to run past this point.

The instant that the massecuite is expelled through the openings 8 it strikes the sides of the conical body 19 and the filtration starts, the molasses going through the holes 20 after passing through the linings 21, 22 in the usual way. The molasses thus expelled will be collected by the cover 18 and lead to the reservoir 33. The massecuite at the same time will slide along the sides of the cone towards the larger end, losing all the while more and more of its molasses, until the edge of the cone 19 is reached, when the sugar crystals practically free of molasses, will be ejected by centrifugal force and collected by cover 30, as indicated by arrows in Fig. 3, when the sugar will be deposited at 32.

This cycle just described will continue uninterrupted as long as the machine is moving and the massecuite is fed to it through pipe 6.

In order to wash the sugar, as it is done in the usual procedure, all that is necessary in this machine is to open the valve 13 allowing water to enter through pipe 12 and holes 10 into the cone 19 where it will strike the massecuite and pass through it, thus washing it of molasses.

It is evident that the amount of treatment given to the massecuite, and the corresponding quality of sugar desired, depends on the speed at which this machine is run, and the amount of water injected, as well as the amount of massecuite admitted through valve 1.

Referring now to Figure 4, which shows a modification, 6a designates the pipe through which the moving massecuite flows from a suitable source (not shown). Pipe 6a connects through a coupling 5a, which permits rotation, with the interior of the hollow shaft 4a, which is rotatably supported in a bearing 3a. Shaft 4a has secured to it the basket assembly. The basket assembly comprises a conically shaped metal basket portion 19a provided with perforations. Standard screens 21a and 22a are provided within the basket. Secured to the shaft 4a by set screws 25a is a member 23a provided with a flared out portion 23b, shaped to conform to the angle of the cone of the basket. The portion 23b is also adapted to clamp the screens to the conical basket, clamping being effected by tightening up member 24a by a spanner or otherwise. The inner surface 23c of flared out portion 23b is smooth, and constitutes the massecuite receiving portion of the basket assemblage. Massecuite is delivered into the cone through a plurality of elongated apertures 8a, in shaft 4a, which as shown are placed opposite the smooth portion 23c. The massecuite conduit in hollow shaft 4a is blocked off beyond the apertures 8a by a partition 9a. If desired a water inlet pipe 12a may extend through the T of pipe 6a, through the hollow shaft, and through partition 9a, in order that water may be delivered into the space 50, defined by the inner walls of the hollow shaft, by partition 9a, and by block 51. A series of apertures 10a are provided for delivering water into the interior of the basket. If desired the exterior of the pipe 12a may be provided with threads 12b to facilitate the flow of the massecuite through the hollow shaft. Supported on the hollow shaft 4a beyond the apertures 10a is a disc 52 for a purpose to be described later. Block 51 is hollowed out to receive solid shaft 53, which may be secured to the block 51 and the hollow shaft 4a. As shown, a pin 54 is provided for this purpose. The solid shaft 53 extends beyond the basket and is supported by bearing 3b, and is directly connected by a coupling to the shaft of the driving motor 55.

To provide support for the larger end of the basket, a spoke assemblage is provided, which comprises a hub portion 26a fixed to the shaft 53 by set screws or otherwise. This hub is provided with several spokes 27a which at their outer ends pass through slots 19b in the basket, and which spokes, beyond the basket, receive nuts 28a which may be tightened, both to secure the basket to the shaft and to centralize it upon the shaft.

As in the other embodiment, a molasses collecting receptacle 18a is provided, as well as a sugar collecting receptacle 30a. As shown, the basket proper is perforated at a portion intermediate planes 56 and 57.

Beyond plane 57 the basket proper is solid with no perforations, and such portion 19c has a relatively smooth surface, which extends to the terminating periphery of the larger end of the basket. Just beyond the plane 57 the interior of the basket is provided with a ring of wire 58 (see Fig. 5) which is soldered to the interior surface of the basket. The finest screen passes over this ring and terminates shortly beyond it. The coarser screen, or screens, terminate just at this ring. The purpose of this ring is to prevent molasses from flowing along the inside of the basket at points beyond the last row of perforations 20a. Molasses that would flow past this point would meet the sugar crystals again, and be delivered with them, which of course is undesirable because it would defeat the very purpose of this machine. It will be understood that molasses flowing laterally through the coarse screen, or screens, or along the interior of the perforated basket, will be arrested by the ring 58 and diverted by centrifugal force through the last row of perforations 20a. A baffle ring 59 provided in proximity to ring 58, but upon the outside of the basket, diverts the molasses from the edge of the basket. A supplementary diverting ring 60 is also provided on the basket just beyond the baffle ring 59, and in close proximity to it. The molasses collecting receptacle 18a has a portion 18b extending toward the basket and terminating over ring 60. This construction prevents the molasses from passing over to the sugar collector. Collectors 18a and 30a are separated at all points from each other, the space between them being bridged by a metal band 18c bolted to both, making a rigid construction, and serving as a safety guard. If any molasses drippings from 18b should come in contact with ring 60 they would be thrown off by centrifugal force and caught again by 18b.

In the operation of the machine the massecuite is continuously admitted through the apertures 8a. The massecuite falls first directly upon the smooth conical portion 23c and readily slides toward the larger end of the cone. In this way clogging at the inlet point is prevented. The massecuite after passing the end of 23b reaches the screens, and separation of the molasses from the sugar crystals begins. The disc 52 prevents any lumps of massecuite from splashing or rebounding, upon coming in contact with the revolving basket, and passing unpurged toward the delivery outlet. This disc has its periphery terminating a short distance from the rotating screen, so as to allow the material to flow smoothly out. In operation the layer of material on the screen diminishes progressively in thickness as it moves longitudinally outward toward the delivery periphery of the basket. Such material is also progressively subjected to progressively increasing centrifugal force on account of the increasing diameter of the cone toward the delivery periphery. The material accordingly becomes progressively drier and drier, with less and less molasses, until separation is complete at ring 58. The sugar crystals continue their outward movement until they reach the delivery periphery of the basket.

By the construction provided, the molasses delivery is well separated from the sugar delivery, thus effectively preventing the molasses from coming in contact again with sugar crystals previously dried. Delivery of the dry sugar crystals is also facilitated by the smooth portion 19c of the basket, adjacent the delivery periphery, and beyond the edge of the fine screen. By having this part of the basket smooth, resistance against sliding movement is minimized and the dried sugar crystals readily slide to the delivery periphery.

Water may be admitted or not, as desired, by valve 13a at the water pipe 12a; the amount of water depending on the quality of sugar, or material being purged.

In practice to provide proper extraction, or purging of the molasses, and at the same time proper sliding of the sugar crystals toward the delivery periphery, the cone angle should be approximately 72 degrees. The size of the cone so far as its small and large diameters, and length is concerned, should be coordinated to the speed of rotation of 1750 R. P. M.

It is also evident that within the mentioned principles it is possible to make some modifications without departing from the basic features and principles of this invention, therefore I do not wish to limit myself to the description just given, but wish to be properly protected within the scope of the following claims:

1. A continuous automatic separator having a rotary hollow shaft, a perforated metallic conical body secured at its smaller end to said shaft, a transverse partition in said hollow shaft, discharge means from said hollow shaft on each side of said partition opening into the interior of said conical body, means for feeding material to be separated through the hollow shaft on the side of said partition toward the smaller end of the conical body, a water pipe extending into the other end of the hollow shaft to a portion of the shaft enclosed by the conical body, and means for adjusting said water pipe longitudinally within said shaft for regulating the flow of water whereby the washing of the treated material is regulated.

2. A centrifuge for separating massecuite into molasses and sugar crystals, comprising a conical rotatable basket with a plurality of superimposed screens therein, means for continuously rotating the basket, means provided for the input of massecuite into the interior of the basket adjacent the smaller end of the cone, with such proportion as to provide for the continuous delivery of sugar crystals over the discharge periphery of the larger end of the basket, and for the continuous purging of massecuite through the basket, and means for preventing undesired flow of molasses to the delivery periphery of the basket, said means including means extending inwardly from the inner surface of said basket to prevent flow of molasses longitudinally outward between the basket and the screw adjacent the basket wall.

3. A centrifuge for separating massecuite into molasses and sugar crystals comprising a conical basket perforated at points intermediate the ends, screening means over said perforated portion, a hollow rotary shaft for delivering massecuite into the interior of the basket in proximity to the smaller end of the basket under the influence of centrifugal force during maintained rotation thereof, said basket having smooth unscreened wall portions at the point where massecuite is initially received to provide for immediate sliding movement of the massecuite toward the screened portion, and means for admitting water to said basket through said hollow shaft.

4. A centrifuge for effecting the extraction of molasses from massecuite which is continuously supplied and for affording continuous discharge of dry sugar crystals during maintained rotation, comprising a continuously rotatable conical basket with means for delivering massecuite therein adjacent the smaller end thereof under the influence of centrifugal force, said basket having the walls adjacent the massecuite input point smooth, so as to provide for immediate longitudinal sliding movement of the massecuite as it is received by the basket, screening means over the perforated portion of the basket beyond said smooth wall portion over which the solid material slides longitudinally, said perforated portion of the basket terminating short of the periphery of discharge for the sugar crystals at the larger end of the basket, and means to check flow of molasses longitudinally within the basket at a point beyond the perforated part of the basket, said means cooperating to divert molasses through the perforated portion of the basket, whereby molasses is prevented from mixing with the delivered dry sugar crystals.

5. A continuous centrifuge with a conical basket which is perforated intermediate the ends and with its perforations terminating at a plane spaced a little distance from the discharge periphery, screening means within the basket, and a liquid entrapping ring extending above the inner surface of the basket in proximity to the terminating perforations to divert liquid therethrough, and to prevent such liquid from flowing further in a longitudinal direction toward the delivery periphery of the basket.

6. A continuous centrifuge comprising a conical basket which is perforated between planes, each spaced from the smaller and larger end of the basket, said basket being provided with screening means cooperating with the perforated portion thereof, and means within said basket to check the flow of liquid beyond the point of termination of the perforations at the plane spaced from the larger end of the basket and to divert such liquid through such perforations, whereby such liquid is prevented from mixing with the dry material that is continuously delivered over the larger end of the basket.

7. A centrifuge with a perforated conical basket having the perforations terminating at a distance from the larger discharge periphery thereof, multiple screening means, a liquid entrapping ring within the basket sealed thereto and beyond the point of termination of the perforations, the outer screens terminating short of said ring, while the innermost screen extends over said ring for the purpose described.

8. A continuous centrifuge with a conical rotatable basket which is perforated intermediate its ends, a hollow supply shaft leading into, and secured to, the smaller end of the basket, and a fixed water inlet pipe disposed substantially centrally within the hollow shaft and provided with exterior threaded portions to promote the endwise flow of material through said hollow shaft upon rotation of the hollow shaft with the basket.

9. A continuous automatic separator for separating massecuite into dry material and liquid components, including in combination a screened perforated conical basket with a conically disposed discharge section at its larger end, a hollow horizontally disposed shaft for rotating said basket and for affording supply of massecuite into the smaller end of the basket and for also affording supply of wash water to the material in the basket, said shaft having a transverse partition therein and being provided with massecuite outlet ports on one side of said partition adjacent the smaller end of the basket and water outlet ports upon the other side of said partition, the space between said basket and said shaft being substantially unobstructed to provide for the unrestricted sliding movement of the progressively drying and dry material at all points to the discharge thereof.

10. A continuous automatic centrifugal separator for separating massecuite into dried sugar crystals and liquid components, comprising a horizontally disposed shaft having a transverse partition therein, a perforated conical basket secured to the shaft for rotation therewith and having screening means over the perforated portion of the basket, the space between said basket and said shaft being substantially unobstructed to provide for the unrestricted sliding movement of the progressively drying and dry material at all points to the discharge thereof, means providing a continuous supply of massecuite through the hollow shaft to the massecuite outlet ports therethrough on one side of the partition in the shaft and adjacent the smaller end of the basket and means providing for wash water supply through the hollow shaft to the water outlet ports upon the other side of the partition in said shaft.

11. A continuous automatic separator for separating massecuite into dry material and liquid components, including in combination a hollow drive shaft, a screened perforate conical basket carried by said shaft, an imperforate section at the smaller end of said basket, a massecuite inlet at one end of said shaft, means within said shaft for mechanically moving massecuite to discharge passages in the wall of said shaft, radial discharge passages in said shaft adapted to discharge massecuite towards said imperforate section under the influence of centrifugal force, a transverse partition in said shaft beyond said discharge passages, a water supply pipe located within said shaft adapted to supply water to the section of said shaft beyond said partition, and water outlets from said section of said shaft, the space between said basket and said shaft being substantially unobstructed to provide for the unrestricted sliding movements of the progressively drying and dry material at all points to the discharge thereof.

12. A centrifuge for separating massecuite into molasses and sugar crystals, comprising a conical basket perforated at points intermediate the ends, with screening means over the perforated portion, means comprising a hollow shaft which rotates the basket for affording supply of massecuite through outlet ports in said shaft under the influence of centrifugal force during maintained rotation of the shaft and basket, said basket having smooth unscreened wall portions at the point where the massecuite in initially received to provide for an immediate sliding movement of the massecuite toward the screened portion, the aforesaid hollow shaft having water outlet ports through the walls thereof and having a transverse separating partition between said ports and the massecuite outlet ports, and means affording water supply to the water ports through the hollow shaft.

FEDERICO GUILLERMO SANCHEZ Y CIL.